United States Patent
Wood et al.

(10) Patent No.: US 8,949,951 B2
(45) Date of Patent: *Feb. 3, 2015

(54) GENERATING MODULAR SECURITY DELEGATES FOR APPLICATIONS

(75) Inventors: Thomas Alexander Wood, Raleigh, NC (US); John J. Eckersberg, II, Apex, NC (US); Daniel P Radez, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 401 days.

This patent is subject to a terminal disclaimer.

(21) Appl. No.: 13/040,774

(22) Filed: Mar. 4, 2011

(65) Prior Publication Data

US 2012/0227095 A1    Sep. 6, 2012

(51) Int. Cl.
*H04L 29/06* (2006.01)
*H04W 12/06* (2009.01)

(52) U.S. Cl.
CPC .............. *H04W 12/06* (2013.01); *H04L 63/08* (2013.01)
USPC ................... 726/5; 726/4; 713/166; 713/168

(58) Field of Classification Search
CPC ..... G06F 21/41; H04L 63/102; H04L 63/105; H04L 63/205; H04L 63/0272; H04L 63/08
USPC .......... 713/182, 166, 168; 726/1–10; 707/783
See application file for complete search history.

(56) References Cited

U.S. PATENT DOCUMENTS

| | | | |
|---|---|---|---|
| 6,510,236 B1 * | 1/2003 | Crane et al. | 382/116 |
| 6,668,322 B1 * | 12/2003 | Wood et al. | 713/182 |
| 7,552,222 B2 * | 6/2009 | Garimella et al. | 709/229 |
| 7,676,829 B1 | 3/2010 | Gui et al. | |
| 7,891,001 B1 | 2/2011 | Greenawalt et al. | |
| 7,904,949 B2 * | 3/2011 | Bowers et al. | 726/10 |
| 7,926,086 B1 * | 4/2011 | Violleau et al. | 726/1 |
| 7,979,899 B2 * | 7/2011 | Guo et al. | 726/7 |
| 8,166,071 B1 * | 4/2012 | Korablev et al. | 707/783 |
| 8,224,873 B1 * | 7/2012 | Korablev et al. | 707/809 |
| 2003/0154401 A1 | 8/2003 | Hartman et al. | |
| 2004/0006590 A1 | 1/2004 | Lucovsky et al. | |

(Continued)

OTHER PUBLICATIONS

Wood et al., °Systems and Methods for Generating Modular Security Delegates for Applications', U.S. Appl. No. 13/048,142, filed Mar. 15, 2011.

Wood et al., "Systems and Methods for a Security Delegate Module to Select Appropriate Security Services for Web Applications", U.S. Appl. No. 13/118,841, filed May 31, 2011.

(Continued)

*Primary Examiner* — Saleh Najjar
*Assistant Examiner* — Oleg Korsak
(74) *Attorney, Agent, or Firm* — Lowenstein Sandler LLP

(57) ABSTRACT

Embodiments of the present teachings relate to systems and methods for generating modular security delegates for applications. According to embodiments, in a multiple network environment, multiple machines (or clients) can be configured. Each machine can include a plurality of application instances and an authentication delegate. In addition, each network environment can include a communication interface to security services. The applications can include logic that indicates what security delegate to use for a given set of user authentication credentials. The logic can be configured to determine the appropriate authentication delegate using various methods. The authentication delegates can receive a set of user authentication credentials from application instances and determine whether the set of user authentication credentials are valid. Each authentication delegate corresponds to one and only one type of authentication mechanism.

20 Claims, 3 Drawing Sheets

(56) References Cited

U.S. PATENT DOCUMENTS

| | | |
|---|---|---|
| 2004/0015596 A1 | 1/2004 | Sapuram et al. |
| 2004/0168090 A1 | 8/2004 | Chawla et al. |
| 2005/0005094 A1 | 1/2005 | Jamieson et al. |
| 2005/0028011 A1 | 2/2005 | Motoyoshi et al. |
| 2005/0114701 A1 | 5/2005 | Atkins et al. |
| 2007/0289005 A1* | 12/2007 | Kumar et al. .................. 726/10 |
| 2008/0028203 A1 | 1/2008 | Sakai |
| 2008/0028453 A1 | 1/2008 | Nguyen et al. |
| 2008/0046961 A1 | 2/2008 | Pouliot |
| 2008/0077809 A1 | 3/2008 | Hayler et al. |
| 2008/0313719 A1 | 12/2008 | Kaliski et al. |
| 2010/0071024 A1 | 3/2010 | Eyada |
| 2010/0107222 A1 | 4/2010 | Glasser |
| 2011/0202988 A1 | 8/2011 | Otranen et al. |
| 2011/0265166 A1 | 10/2011 | Franco et al. |
| 2012/0144464 A1 | 6/2012 | Fakhrai et al. |

OTHER PUBLICATIONS

USPTO, Final Office Action for U.S. Appl. No. 13/048,142 mailed Jan. 15, 2013.
USPTO, Office Action for U.S. Appl. No. 13/118,841 mailed Feb. 28, 2013.
USPTO, Office Action for U.S. Appl. No. 13/048,142 mailed on Sep. 12, 2012.
Uspto, Office Action for U.S. Appl. No. 13/118,841 mailed on Nov. 14, 2012.
USPTO, Advisory Action for U.S. Appl. No. 13/048,142 mailed Mar. 27, 2013.
USPTO, Office Action for U.S. Appl. No. 13/048,148 mailed Apr. 15, 2014.
USPTO, Final Office Action for U.S. Appl. No. 13/118,841 mailed Jul. 5, 2013.
USPTO, Notice of Allowance for U.S. Appl. No. 13/118,841 mailed Sep. 16, 2013.

* cited by examiner ns is defined by the appended claims and their equivalents.

GENERATING MODULAR SECURITY DELEGATES FOR APPLICATIONS

FIELD

This invention relates generally to authenticating user credentials using a separate modular security delegate for applications.

DESCRIPTION OF THE RELATED ART

There are many applications that require access by multiple types of users. For example, administrators who can have high levels of access, external users who can have lower levels of access, employees of a company that is providing the application who can have middle levels of access, etc. For each type of user/access, the applications can provide different functionality, which can be protected by requiring a specific level of security for each user type.

However, in many applications, building in multiple authentication and authorization levels can pose a problem, if, for example, different authentication mechanisms and/or authorization mechanisms are used. As used herein, authentication and authentication mechanisms can be directed to determining if the user is the actual user identified, whereas authorization and authorization mechanisms can be directed to determining the role and/or functionality allowed for the user. As will be understood, authentication and authorization mechanisms are well known in the art and will be briefly discussed herein as needed.

The different authentication mechanisms can include, but are not limited to, Kerberos, SSL, digest authentication, NT LAN manager authentication protocol, tokens, virtual remote security access, LDAP authentication, etc. For example, if the application is capable of accepting multiple forms of authentication, this can create an unacceptable level of risk since it could expose, for example, internal corporate authentication mechanisms to brute-force attacks from, for example, the internet, and this could also cause ambiguous credentials that could be valid for one form of authentication but not the other.

Therefore, there is a need to ensure that all types of users can use various applications and that authentication is as strong as necessary for various applications and environments.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
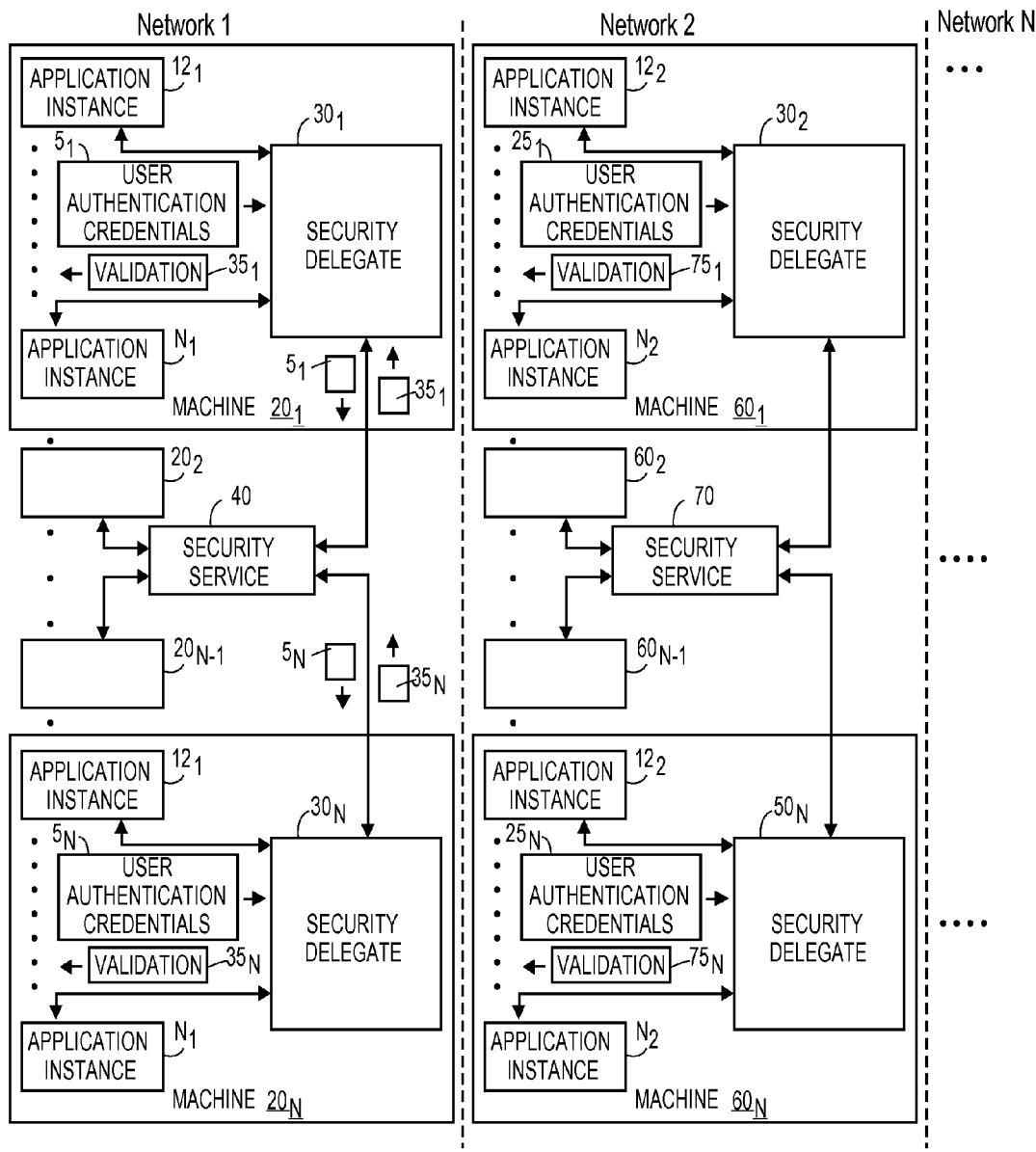
FIG. 1 illustrates an example of plurality of networks that include authorization delegates, in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for generating modular security delegates for applications, including, for example, applications usable on physical machines, virtualized environments, in the cloud, etc. According to embodiments, in a multiple network environment, multiple machines (that can be, for example, clients, containers, Java virtual machines (JVM), etc.) can be configured. Each machine can include a plurality of application instances, a directory interface, and a security delegate. The directory interface can communicate with a directory, for example, a naming directory (as in Java), that can be instantiated in each machine environment. The security delegate can be a service, an application, a wrapper, a DLL, code, a proxy, a java class, a java bean, etc. In addition, each network environment can include a communication interface to security services. Security services can include, but are not limited to, any internal or third party hosting service that can authenticate and/or authorize users. For example, security services can use Kerberos, NT Lan Manager (NTLM) authentication protocol, secure sockets layer/transport security layer (SSL/TSL), token authentication, virtual private network (VPN), remote access security (RAS), digest authentication, LDAP authentication etc., for authentication.

According to embodiments, the applications do not authenticate user credentials themselves. Instead, the applications can include logic that indicates what security delegate to use for a given set of user authentication credentials. For example, the applications can include logic that points to a directory that includes the appropriate security delegate for a given application instance. User authentication credentials can include, but are not intended to be limited to, tokens, user-names, passwords, keys, generated random numbers, certificates, tickets, etc. According to embodiments, the logic can be configured to determine the appropriate authentication security delegate using various methods. For example, the appropriate security delegate can be based on which application instance received the user credentials, the network location of the directory, the network location of the application instance, etc. Alternatively, the type of user or class of authentication credentials received can be used to determine the appropriate security delegate.

According to embodiments, the security delegates can receive a set of user authentication credentials from application instances and determine whether the set of user authentication credentials are valid. Each security delegate can correspond to one type of authentication mechanism. For example, one security delegate can determine if Kerberos credentials are valid, another security delegate can determine if SSL credentials are valid, etc. Also, each application instance can send the set of user authorization credentials to one security delegate (e.g., there can be a one to one correspondence).

The level of security used by each security delegate in each corresponding network can be determined by, for example, owners of the network, administrators, operators, cloud providers, etc. Also, the term network as used herein can include physical networks, virtual networks, cloud networks, clusters, sub-nets, partitions, etc.

FIG. 1 illustrates an example of multiple network environments 1, 2 . . . N that can include multiple machines $20_1$ to $20_N$, $60_2$ to $60_N$, etc. For purposes of this description, it is assumed that each machine contains the same general elements in each network and therefore, a single machine for networks 1 and 2 with reference to FIG. 1 will be described. Machine $20_1$ can include a plurality of application instances $12_1$ to $N_1$ and a security delegate $30_1$. The security delegate $30_1$ can include a communication interface (not shown) that allows security delegate $30_1$ to communicate with a security service 40 within the same network 1. The application instances $12_1$ to $N_1$ within machine $20_1$ can be the same or different. For example, application instance $12_1$ can be a procurement application and application instance $12_N$ can be another instance of the procurement application or an instance of a messaging application. In addition, the application instances across machines $20_1$ to $20_N$ in the same network 1 can be the same or different depending on each machine's current use. For example, application instance $12_1$ can be a procurement application in machine $20_1$ whereas application $12_1$ can be a messaging application in machine $20_N$. It will be understood that while examples of certain network components are illustrated, other well known components can be included, for example, servers, other machines, applications, ports, etc.

Similarly, in network 2, machine $60_1$ can include a plurality of application instances $12_2$ to $N_2$ and a security delegate $50_1$. The security delegate $50_1$ can include a communication interface (not shown) that allows security delegate $50_1$ to communicate with a security service 70 within the same network 2. The application instances $12_2$ to $N_2$ within machine $60_1$ can be the same or different. For example, application instance $12_2$ can be a procurement application and application instance $N_2$ can be another instance of the procurement application or an instance of a messaging application. In addition, the application instances across machines $60_1$ to $60_N$ in the same network can be the same or different depending on each machines' current use. For example, application instance $12_2$ can be a procurement application in machine $60_1$ whereas application $12_2$ can be a messaging application in machine $60_N$.

As can be seen in FIG. 1, while the network components are similar within networks 1, 2 . . . N, across networks 1, 2 . . . N there are some distinctions. For example, each machine 20 in network 1 can have a corresponding machine 60 in network 2 shown by the subscript number. The application instances $12_1$ to $N_1$ can be instances of the same application corresponding to each network 1, 2 . . . N, as identified by the subscript number. Also, the security delegate $30_1$ in network 1 has a corresponding defined security (security service 40) associated with it, as does security delegate $60_1$ (security service 70). In various embodiments, the defined authentication mechanism will be different between networks. For example, network 1 can correspond to an internal network, for example, an internal corporation LAN or WAN, whereas network 2 can correspond to an external network, for example, the internet. Network N can also correspond to, for example, an external network, such as the internet but using a different authentication mechanism. Generally, networks 1, 2 . . . N can be or include the Internet, other public, and/or private networks. The networks 1, 2 . . . N can also be or include wired, wireless, optical, and other network connections. One skilled in the art will realize that the networks 1, 2 . . . N can be any type of network, utilizing any type of communication protocol, to connect computing systems. Also, one skilled in the art will realize that a plurality of networks can be used, as long as different defined security levels are applied to each.

According to embodiments, a user can be associated with a certain level of security. For example, the user can be an employee of a corporation who can use the corporation's internal network. Alternatively, the user can be an external user (not an employee of the corporation) using, for example, the internet and have RAS credentials. For purposes of this embodiment, a two network embodiment will be used, where the corporation's internal network corresponds to network 1 and the internet corresponds to network 2. In this embodiment, an application 12 (not shown) can be accessed by a user. The application 12 is viewable from both network 1 and network 2. For example, the application 12 is viewable in network 1 through application instance $12_1$ and in network 2 through application instance $12_2$. As discussed above, there can be any number of applications and corresponding instances.

In this embodiment, the corporation can decide on the level of security required for each type of user. For example, an internal user can be authenticated by a strong authentication mechanism, e.g., Kerberos, and an external user can be authenticated by a weaker authentication mechanism, e.g., RAS. The authentication mechanism used can be based on various parameters, for example, regulatory requirements, compliance requirements, etc. It will be obvious that in view of the network requirements, various authentication mechanisms, for example, Kerberos, NT Lan Manager (NTLM) authentication protocol, secure sockets layer/transport security layer (SSL/TSL), token authentication, virtual private network (VPN), remote access security (RAS), digest authentication, LDAP authentication, etc., can be used for each network.

It is assumed for purposes of this embodiment that a set of user authentication credentials 5 or 25 have been obtained by the user by any known method, for example, by a user registering with, for example, the corporation and/or a corresponding security service.

For a user having access to network 1, application 12 can be instantiated in machine $20_1$. The application instance $12_1$ can request a set of user authentication credentials $5_1$, for example, through a log-in screen, from the user. The user can enter in the set of user authentication credentials $5_1$, for example, a user-name, a password, a token, etc. Once the application 12 (not shown) receives the set of user authentication credentials 5, the application 12 can identify the corresponding security delegate $30_1$. The application 12 can identify the corresponding security delegate $30_1$ using, for example, a directory interface (not shown) to a directory (not shown) that can list the appropriate security delegate $30_1$ based on, for example, the network location of the corresponding application instance $12_1$ that received the user authentication credentials $5_1$, the network location of the directory, etc. The directory can be, for example, a naming directory (as in Java), that can be instantiated in each machine environment. As network 1 has a corresponding defined security level (e.g., strong), the security delegate $30_1$ can be configured to apply the same defined security level using the designated authentication mechanism (e.g., Kerberos) to validate the set of user authentication credentials $5_1$ sent from application instance $12_1$. As shown in FIG. 1, security delegate $30_1$ can communicate through an interface (not shown) with a security service 40.

The security service 40 can include, for example, servers, databases, communication interfaces, etc. based on a given authentication and/or authorization mechanisms. In this embodiment, security service 40 can correspond to Kerberos authentication. The security delegate $30_1$ can communicate with security service 40 to validate the set of user authentication credentials $5_1$. Validation 35, can be performed by various known methods based on the authentication mechanism used.

For a user having access to network 2, the user instantiates application 12 in machine $20_2$. The application instance $12_2$ can request a set of user authentication credentials $25_1$, for example, through a log-in screen, from the user. The user can enter in the set of user authentication credentials $25_1$, for example, a user-name, a password, a token, etc. Once the application 12 (not shown) receives the set of user authentication credentials 25, the application 12 can identify the corresponding security delegate $50_1$. The application 12 can identify the corresponding security delegate $50_1$ using, for example, a directory interface (not shown) to a directory (not shown) that can list the appropriate security delegate $50_1$ based on, for example, the network location of the corresponding application instance $12_2$ that received the user authentication credentials $75_1$, the network location of the directory, etc. The directory can be, for example, a naming directory (as in Java), that can be instantiated in each machine environment. As network 2 has a corresponding defined security level (e.g., less strong), the security delegate $50_1$ can be configured to apply the same defined security level using the designated authentication mechanism (e.g., RAS) to validate the set of user credentials $25_1$ sent from application instance $12_2$. As shown in FIG. 1, authentication delegate $50_1$ can communicate through an interface (not shown) with a security service 70.

The security service 70 can include, for example, servers, databases, communication interfaces, etc. based on a given authentication mechanism. In this embodiment, security service 70 can correspond to RAS. The security delegate $50_1$ can communicate with security service 70 to validate the set of user authentication credentials $25_1$. Validation $75_1$ can be performed by various known methods based on the authentication mechanism used.

One example of a situation in which the plurality of networks shown in FIG. 1 can be used can be for procurement. For example, a corporation needs to procure various items using an application that allows both internal employees to request an item and external suppliers to bid on supplying the requested item. However, in this example the corporation can want to allow different functionality and access privileges to each type of user (external and internal), for example, to protect various parts of the internal network and proprietary information. In such an example, the internal network can be accessed by internal employees having strong security credentials, e.g., based on Kerberos, whereas the external suppliers can access the application via an external network, where the external network uses a less strong security, e.g., RAS.

In yet additional embodiments, additional networks (and/or physical networks, virtual networks, cloud networks, clusters, sub-nets, partitions, etc.) can be added so that there can be a third network, a fourth network, etc. According to these embodiments, each network can have a different security level and a corresponding different security delegate/security service.

Figure 2:
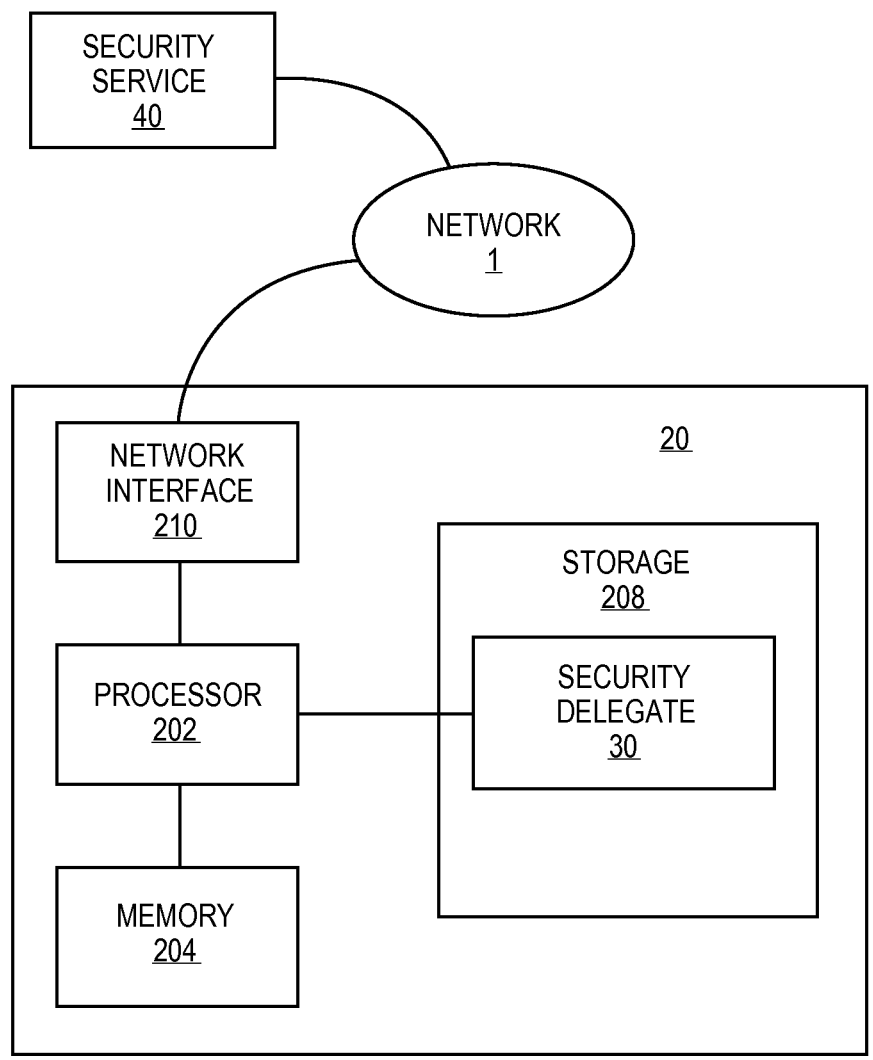
FIG. 2 illustrates an exemplary hardware configuration for an authorization delegate, according to various embodiments.

FIG. 2 illustrates an exemplary diagram of hardware and other resources that can be incorporated in any of the machines 20, and configured to store and execute the security delegate 30, according to embodiments. In embodiments as shown, the machines 20 can comprise a processor 202 communicating with a memory 204, such as electronic random access memory. The processor 302 also communicates with one or more computer readable storage devices or media 208, such as hard drives, optical storage, and the like, for maintaining the authorization delegates 30. The processor 202 further communicates with network interface 210, such as an Ethernet or wireless data connection, which in turn communicates with one or more networks 1, such as the Internet or other public or private networks. The machine 20 can also communicate with a security service 40 through network 1 and network interface 210.

The processor 202 also communicates with the security delegates 30 to execute the logic of the security delegates 30 and to allow performance of the processes as described herein. Other configurations of the machines 20, associated network connections, and other hardware and software resources are possible.

While FIG. 2 illustrates the machines 20 as a standalone system including a combination of hardware and software, the machines 20 can include multiple systems operating in cooperation. As described above, the security delegate 30 can be implemented as an application program capable of being executed by the machines 20, as illustrated, or other conventional computer platforms. Likewise, the security delegate 30 can also be implemented as a software module or program module capable of being incorporated in other software applications and programs. In any example, the security delegate 30 can be implemented in any type of programming language. When implemented as an application program, application module, or program code, the security delegate 30 can be stored in a computer readable storage medium, such as the storage 208, accessible by the machine 20. Likewise, during execution, a copy of the security delegate 30 can be stored in the memory 204.

Figure 3:
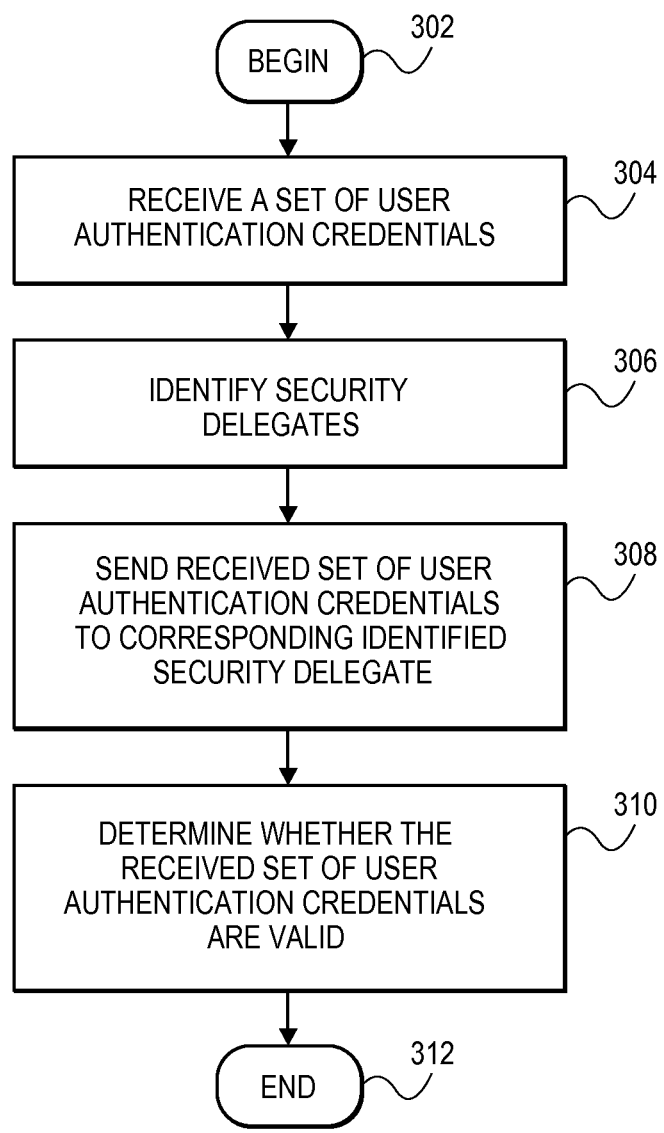
FIG. 3 illustrates a flowchart of an exemplary process for authenticating users across multiple networks using authentication delegates, according to various embodiments.

FIG. 3 illustrates a flow diagram for a process 300 of authenticating a user in at least two networks, according to embodiments of the present teachings. In 302, the process can begin. In 304, an application 12 can receive a set of user authentication credentials 5. For example, application instance $12_1$ can receive a set of user authentication credentials $5_1$ from a user via network 1. The set of user authentication credentials $5_1$ can include, for example, a user-name, a password, a token, a key, etc. Each network 1 and 2 can have a unique defined security level, for example, Kerberos, RAS, digest authorization, etc.

In 306, the application 12 can identify a first or second security delegate $30_1$ or $50_1$ through the use of a directory interface to a directory based on for example, the network location of the corresponding application instance $12_1$ that received the user authentication credentials $5_1$, the network location of the directory, etc. Once an security delegate 30 or 50 is identified, the application instance $12_1$ or $12_2$ sends the set of user authentication credentials 5 or 25 to the corresponding identified security delegate $30_1$ or $50_2$, in step 308.

In step 310, the security delegate $30_1$ or $50_1$ determines whether the set of user authentication credentials $5_1$ or $25_1$ are valid based on a defined level of security. For example, the security delegate $30_1$ or $50_1$ can communicate with a security service 40 or 70 that can include a database of authentication credentials, certificate authorities, etc. For example, security delegate $30_1$ can communicate with a lightweight directory access protocol (LDAP) database if network 1 corresponds to an internal network and security delegate $50_1$ can communicate with an RAS site if network 2 corresponds to the internet.

As discussed above, embodiments can be applied to more than two networks, as long as each network has its own defined level of security. Also a user can initially register with a security service, such as, Kerberos, RAS, SSL, etc., to obtain a set of authentication credentials.

Certain embodiments can be performed as a computer application program. The application program can exist in a variety of forms both active and inactive. For example, the application program can exist as software program(s) comprised of program instructions in source code, object code, executable code or other formats. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software of the computer application program on a CD-ROM or via Internet download.

While the teachings have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" or "at least one of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
receiving, by a first application instance of an application executed by a processor, a first set of user authentication credentials;
identifying, using a directory interface, a network location of a directory;
listing, by the directory interface, a first security delegate in view of a network location of the first application instance of the application and in view of the network location of the directory;
selecting, by the first application instance of the application, the first security delegate;
receiving, by the first security delegate, the first user authentication credentials from the first application instance of the application; and
determining, by the first security delegate, whether the first user authentication credentials are valid in view of a first security level defined for a first network of the first security delegate;
wherein the first security level defined for the first network of the first security delegate is different than a second security level defined for a second network of a second security delegate that determines validity of second user authentication credentials received from a second application instance of the application.

2. The method of claim 1, wherein each of the first security level and the second security level comprises at least one of Kerberos, NT Lan Manager (NTLM) authentication protocol, secure sockets layer/transport security layer (SSL/TSL), token authentication, virtual private network (VPN), remote access security (RAS), digest authentication, or Lightweight Directory Access Protocol (LDAP) authentication.

3. The method of claim 1, wherein the first application instance identifies, through a directory interface, the first security delegate within the first network to send the first user authentication credentials.

4. The method of claim 1, wherein the first network comprises an internal network and the second network comprises an external network, and wherein the first security level is stronger than the second security level.

5. The method of claim 1, wherein the determining whether the first user authentication credentials are valid further comprises communicating through an interface with a security service to validate the first user authentication credentials in view of the first security level.

6. The method of claim 5, further comprising registering a user with the security service.

7. The method of claim 1, wherein the second security delegate sends the second user authentication credentials to a security service associated with the second network, the security service to determine the validity of the second user authentication credentials in view of the second security level.

8. The method of claim 1, wherein the first application instance sends the first user authentication credentials to the first security delegate, wherein the sending is in view of an identity of the first application instance that received the first user authentication credentials.

9. An apparatus comprising:
a memory;
a processor communicably coupled to the memory;
a first application instance executable from the memory by the processor, the first application instance being part of an application that is distributed over a plurality of networks, the first application instance to:
receive a first set of user authentication credentials;
identify, using a directory interface, a network location of a directory;
list, by the directory interface, a first security delegate in view of a network location of the first application instance of the application and in view of the network location of the directory;
select the first security delegate; and
the first security delegate communicably coupled to the first application instance, the first security delegate to:
receive the first user authentication credentials from the first application instance; and
determine whether the first user authentication credentials are valid in view of a first security level defined for a first network of the plurality of networks, the first network associated with the first security delegate;
wherein the first security level defined for the first network is different than a second security level defined for a second network of the plurality of networks that determines validity of second user authentication credentials received from a second application instance of the application, the second network associated with a second security delegate.

10. The apparatus of claim 9, wherein each of the first security level and the second security level comprises at least one of Kerberos, NT Lan Manager (NTLM) authentication protocol, secure sockets layer/transport security layer (SSL/TSL), token authentication, virtual private network (VPN), remote access security (RAS), digest authentication, or Lightweight Directory Access Protocol (LDAP) authentication.

11. The apparatus of claim 9, wherein the first application instance further to identify, through a directory interface, the first security delegate within the first network to send the first user authentication credentials.

12. The apparatus of claim 9, wherein the first network comprises an internal network and the second network comprises an external network, and wherein the first security level is stronger than the second security level.

13. The apparatus of claim 9, wherein the first security delegate to determine whether the first user authentication credentials are valid further comprises the first security delegate to communicate through an interface with a security service to validate the first user authentication credentials in view of the first security level.

14. The apparatus of claim 13, wherein the first security delegate further to register a user with the security service.

15. The apparatus of claim 9, wherein the second security delegate to send the second user authentication credentials to a security service associated with the second network, the security service to determine the validity of the second user authentication credentials in view of the second security level.

16. A non-transitory machine-readable storage medium having instructions, which when executed by a processor, cause the processor to perform operations comprising:
   receiving, by a first application instance of an application executed by the processor, a first set of user authentication credentials;
   identifying, using a directory interface, a network location of a directory;
   listing, by the directory interface, a first security delegate in view of a network location of the first application instance of the application and in view of the network location of the directory;
   selecting, by the first application instance of the application, the first security delegate;
   receiving, by the first security delegate, the first user authentication credentials from the first application instance of an application; and
   determining, by the first security delegate, whether the first user authentication credentials are valid in view of a first security level defined for a first network of the first security delegate;
   wherein the first security level defined for the first network of the first security delegate is different than a second security level defined for a second network of a second security delegate that determines validity of second user authentication credentials received from a second application instance of the application.

17. The non-transitory machine-readable storage medium of claim 16, wherein each of the first security level and the second security level comprises at least one of Kerberos, NT Lan Manager (NTLM) authentication protocol, secure sockets layer/transport security layer (SSL/TSL), token authentication, virtual private network (VPN), remote access security (RAS), digest authentication, or Lightweight Directory Access Protocol (LDAP) authentication.

18. The non-transitory machine-readable storage medium of claim 16, wherein the first application instance identifies, through a directory interface, the first security delegate within the first network to send the first user authentication credentials.

19. The non-transitory machine-readable storage medium of claim 16, wherein the determining whether the first user authentication credentials are valid further comprises communicating through an interface with a security service to validate the first user authentication credentials in view of the first security level.

20. The non-transitory machine-readable storage medium of claim 16, wherein the second security delegate sends the second user authentication credentials to a security service associated with the second network, the security service to determine the validity of the second user authentication credentials in view of the second security level.

* * * * *